March 2, 1965
J. A. LAUCK
3,171,256
HYDROSTATIC TRANSMISSION
Filed Jan. 3, 1963
5 Sheets-Sheet 1
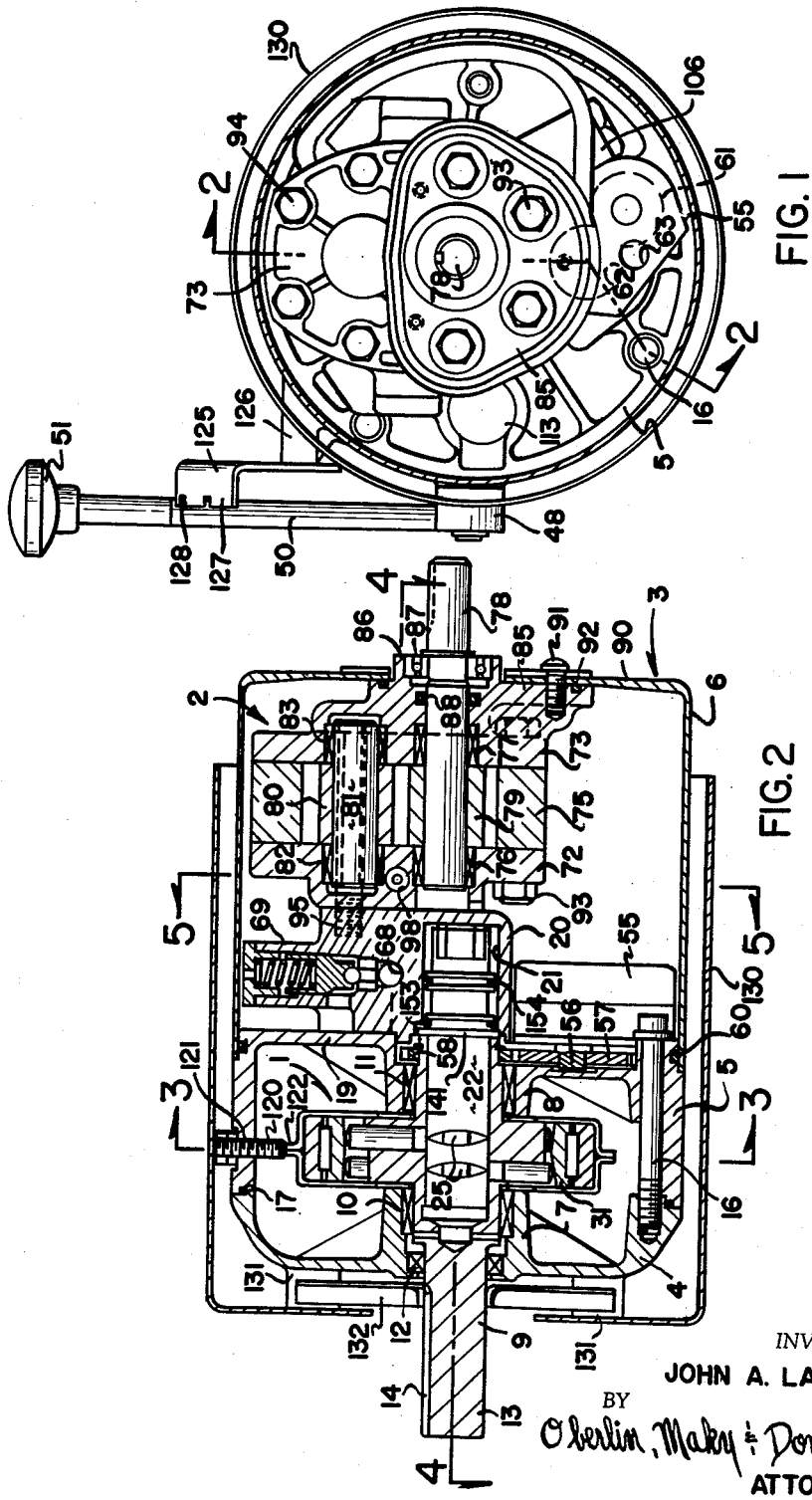
INVENTOR.
JOHN A. LAUCK
BY
Oberlin, Maky & Donnelly
ATTORNEYS

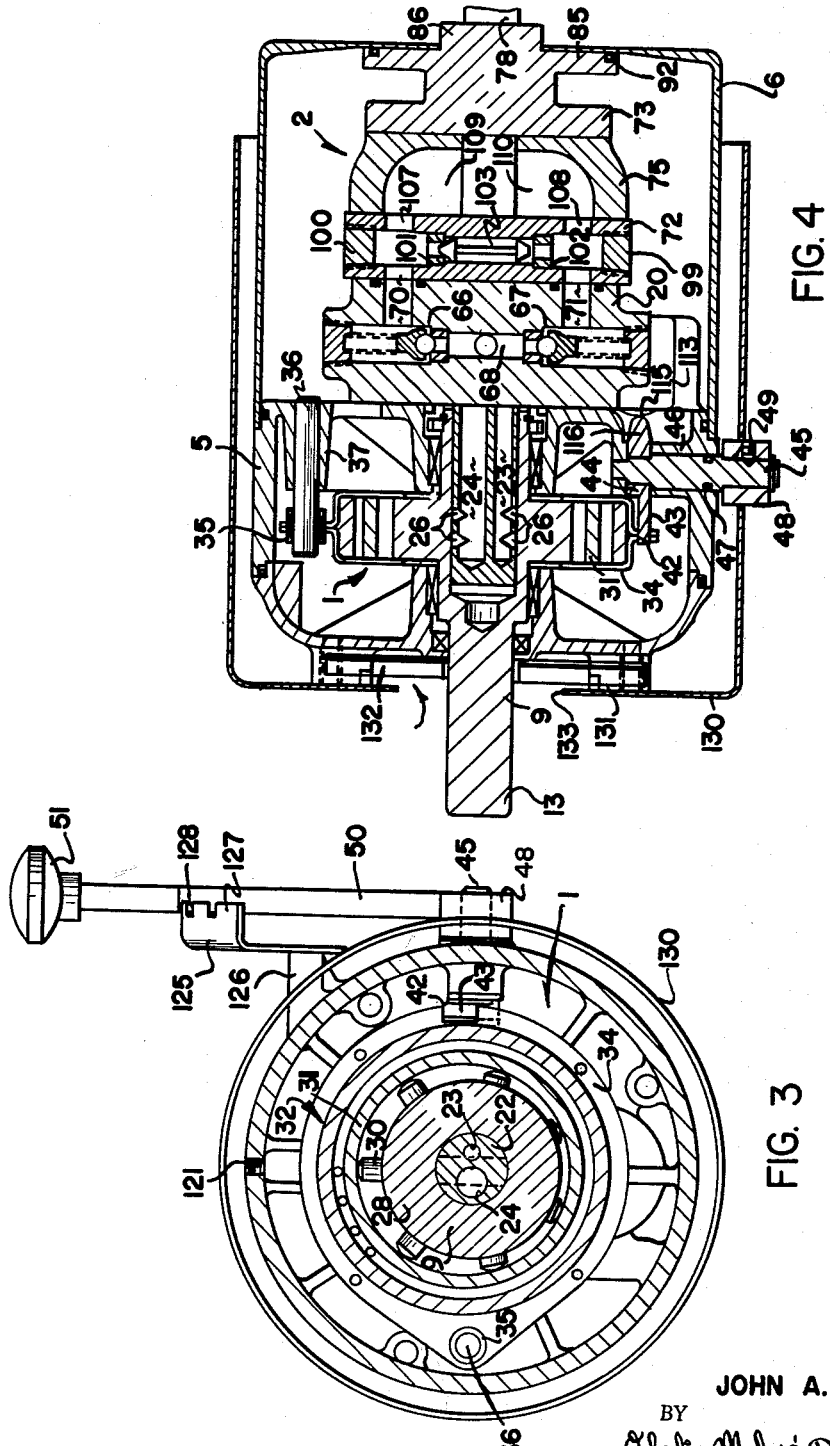

March 2, 1965   J. A. LAUCK   3,171,256
HYDROSTATIC TRANSMISSION
Filed Jan. 3, 1963   5 Sheets-Sheet 3

INVENTOR.
JOHN A. LAUCK
BY
Oberlin, Maky & Donnelly
ATTORNEYS

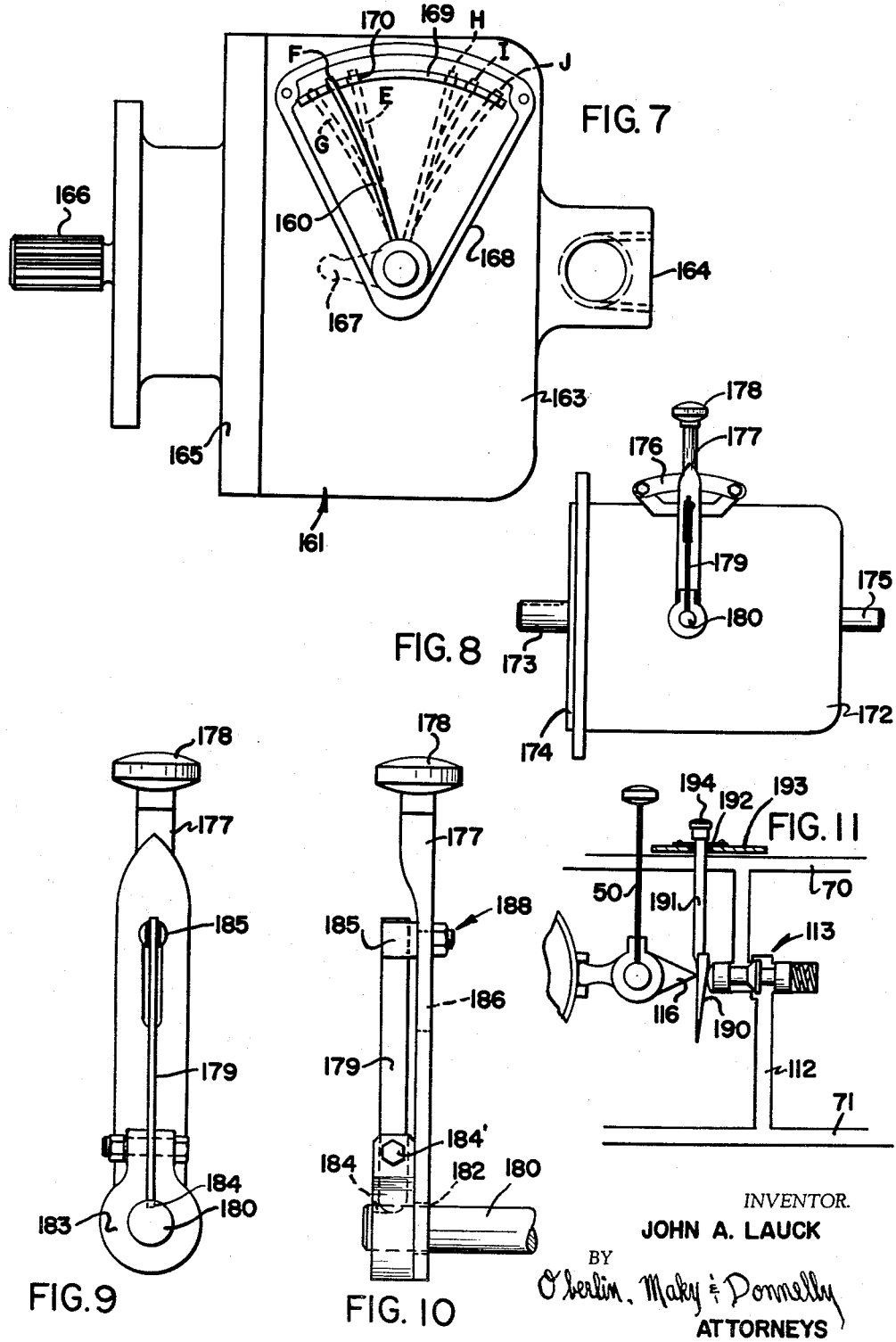

March 2, 1965

J. A. LAUCK 3,171,256

HYDROSTATIC TRANSMISSION

Filed Jan. 3, 1963

INVENTOR.
JOHN A. LAUCK
BY
Oberlin, Maky & Donnelly
ATTORNEYS

United States Patent Office 3,171,256
Patented Mar. 2, 1965

3,171,256
HYDROSTATIC TRANSMISSION
John A. Lauck, 1767 Commonwealth Ave.,
Benton Harbor, Mich.
Filed Jan. 3, 1963, Ser. No. 249,163
28 Claims. (Cl. 60—53)

This invention relates generally, as indicated, to a hydrostatic transmission and more particularly to certain improvements in hydrostatic transmissions of the type shown in my copending application, Serial No. 188,026, filed April 17, 1962, entitled "Hydrostatic Transmission."

In such prior application, there is disclosed a hydrostatic transmission wherein the flow from a rotor-pintle type pump may be varied infinitely automatically to the hydraulic motor in response to changes in torque demands. The pump for the transmission delivers infinitely variable flow with encountered changes in pressure.

In the testing of rotor-pintle type variable volume pumps, it has been noted that the greatest leakage path is between the pintle and the rotor. Consequently, an important object of the present invention is an improvement in the rotor and pintle construction in which the pintle will seal against the end of the rotor to trap the leakage between the rotor and pintle to improve the overall efficiency of the pump and thus the transmission.

In such prior application, Serial No. 188,026, there is disclosed a resilient spring member operative to control the displacement of the radial pintle type pump. It has been found that by pre-positioning the spring type pump control, different performance (capacity expressed per pump outlet pressure, p.s.i.) curves can be obtained. In one designated position of the spring control handle there will be no pre-load on the handle and consequently the pump delivery will vary proportionately with the pressure. However, in other selected positions of the spring handle, the handle is pre-loaded holding the pump in full displacement until a predetermined pressure is reached. The pre-positioning of the handle thus obtains various performance curves and two sectors can be provided for the spring handle, depending upon the direction of flow of the pump. It is, accordingly another important object of the present invention to provide a unique control for fluid pumps in which the performance curves thereof can be programmed.

It is still another object of the present invention to provide a combination rigid and spring member control handle for a pump or transmission which can be adjusted to obtain the desired torque control.

A further object is the provision in a hydrostatic transmission of the type under consideration of a further control whereby a lock out or hill-hold condition may be obtained when the control lever is in neutral, or alternatively, a free-wheel condition may be obtained.

A still further object is the provision of a compact highly efficient hydrostatic transmission capable of many applications.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is an end elevation of a hydrostatic transmission in accordance with the present invention with the housing broken away and in section;

FIG. 2 is a vertical section of such hydrostatic transmission taken substantially on the line 2—2 of FIG. 1;

FIG. 3 is a vertical section of the pump of the hydrostatic transmission taken substantially on the line 3—3 of FIG. 2;

FIG. 4 is a horizontal section of the hydrostatic transmission taken substantially on the line 4—4 of FIG. 2;

FIG. 7 is a side elevation of a modified form of pump control of the present invention with the pump being shown in a separate housing;

FIG. 8 is a side elevation of a transmission housing on a somewhat reduced scale illustrating an improved form of handle control therefor;

FIG. 9 is an enlarged detail view of such handle control;

FIG. 10 is a side elevation of such handle control;

FIG. 11 is a somewhat schematic diagram illustrating a further control which may be interposed between the neutral valve and the pump control to obtain either a hill-hold condition or a free-wheeling condition;

Figure 5:
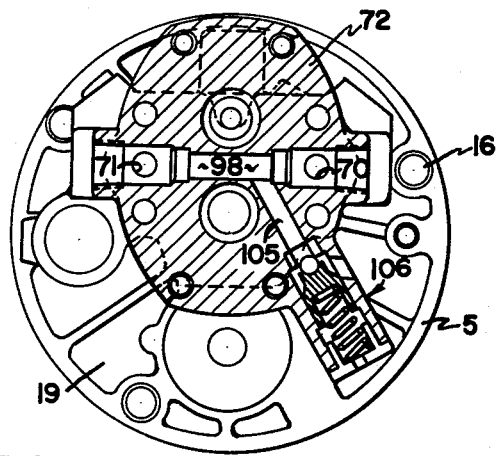
FIG. 5 is a vertical section taken substantially on the line 5—5 of FIG. 2.

Referring now to such annexed drawings and more particularly to FIGS. 1 through 5, there is illustrated a hydrostatic transmission comprised of a pump 1 of the rotor-pintle type and a gear motor 2. The pump 1 and motor 2, which comprise the main components of the transmission, are situated within a housing 3 which includes an end cover member 4, an intermediate annular member 5 and an opposite end cover 6. The cover members 4 and 5 are provided with central hubs 7 and 8 respectively supporting pump rotor 9 on needle or like bearings 10 and 11 within the hubs 7 and 8 respectively. A further bearing and seal arrangement 12 supports and protects the end 13 of the rotor projecting through the housing cover 4. The projecting end 13 of the rotor 9 may be provided with a keyway 14, or otherwise splined and connected to the output shaft of a prime mover such as an internal combustion engine. The covers 4 and 5 may be held together by a plurality of tie bolts 16 and such covers may be provided with overlapping axially extending flanges with a sealing ring 17 therebetween.

Secured to the rear of the plate 19 of the cover 5 is a porting block 20 having a bore 21 therein, the axis of which is aligned with the axis of the rotor 9. Within such bore, there is secured against rotation a pintle 22 having fluid passages 23 and 24 therein. (See FIGS. 4 and 6.) Each of the passages is provided with a pair of substantially elliptical openings 25 and 26 which communicate with radially extending bores 27 in hub portion 28 of the rotor 9. In the illustrated embodiment, there may be fourteen such bores in the hub 28 with such bores being circumferentially equally spaced alternately offset in two spaced axial rows. Mounted for reciprocation in each bore is a piston 30, the outer end of which is slightly rounded as shown and makes contact with the inner race 31 of a roller bearing 32. The inner race as well as the outer race 33 is mounted in a housing 34 which is pivoted at 35 to an axially extending pivot pin 36 mounted in boss or hub 37 of the cover member 5. The rollers 38 of the bearing 32 may be circumferentially spaced by means of a cage 39 or the like and will be axially retained by the shoulders 40 of the outer race 33. (See FIG. 6.)

The housing 34 of the bearing 32, diametrically opposite the pivot pin 36, is provided with a notch 42 receiving a projection 43 of pump control operator 44 mounted on shaft 45 extending through hub 46 of the housing member 5 and projecting outwardly of the housing 3. The control shaft 45 and operator 44 are secured together for rotation as a unit about the axis of the shaft 45. An O-ring or the like 47 may be provided to seal the interior of the housing where the control shaft projects therethrough. On the projecting end of the shaft 45, there is secured a hub 48, as by set screw 49. Mounted on the hub 48 is a control handle 50 having knob 51 on the distal end thereof. Movement of the handle 50 by means of the knob 51 thus rotates the shaft 45 about its axis and the operator 44 in turn to control the position of the bearing 32 about its pivot 36 which in turn controls the eccentricity of the bearing inner race 31 with respect to the axis of the rotor and pintle.

Figure 12:
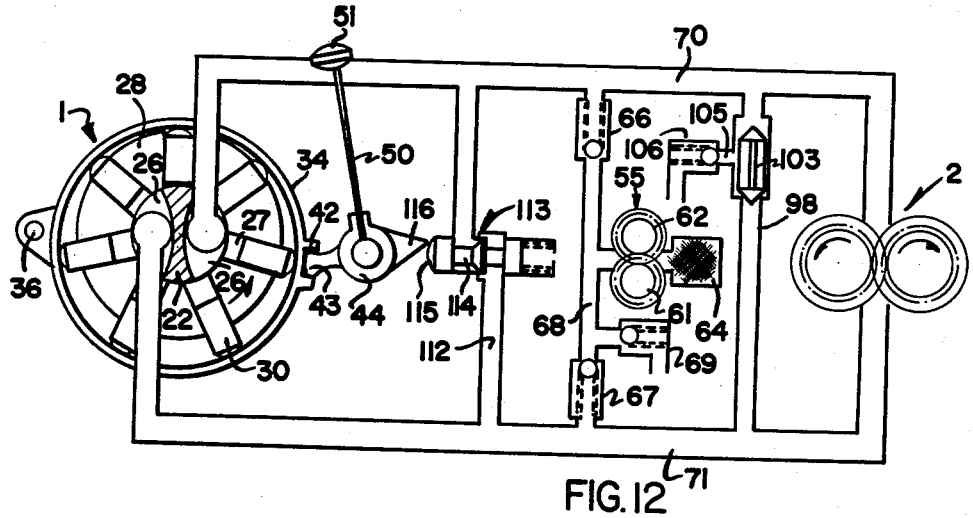
FIG. 12 is a schematic flow diagram of the hydrostatic transmission shown in detail in FIGS. 1 through 6.

Briefly, referring to FIG. 3, it will be seen that as the rotor 9 rotates in a counterclockwise direction, the pistons 30 will move outwardly in the five to twelve o'clock quadrant and will move in towards the pintle in the twelve to seven o'clock quadrant. As the pistons move outwardly, they will be supplied with fluid through passage 23 and ports 26 which are supplied with fluid from a make-up or piston return pump 55, the drive shaft 56 of which is driven by gear 57 thereon in mesh with pinion 58 keyed to the rotor 9. The housing end cover 6, which is sealed at 60, to the intermediate housing 5 is employed to provide a reservoir for the hydraulic or like fluid which is supplied through the make-up pump to the passage 23 and thus to the pistons. The make-up pump 55 may be mounted on the intermediate member 5 just below the block 20 and as seen in FIG. 1 includes two gears 61 and 62 with inlet 63 entering the reservoir provided by the housing 6. As shown in FIG. 12, a filter 64 may be provided for the fluid entering the make-up or return pump 55.

The block 20 interposed between the pump 1 and the motor 2 is provided with two check valves 66 and 67 directing the flow of the make-up pump to the low pressure side of the system. The fluid from the make-up pump 55 will emerge into passage 68 and flow through the check valve open to supply the low pressure side of the pump with sufficient fluid pressure to maintain the pistons 30 against the inner race 31. The passage 68 is also provided with a low pressure, e.g. 50 p.s.i., relief valve 69 seen in FIG. 2 mounted on the top of the block 20. The discharge of such relief valve leads back to the reservoir as provided by the cover 6. In addition, the block 20 is provided with two systems of passageways 70 and 71 communicating with the passageways 24 and 23 in the pintle 22 with the inlet and outlet for the motor 2.

The motor 2, which is mounted on the block 20, comprises two end covers 72 and 73 with a motor housing 75 interposed therebetween. Such covers 72 and 73 are provided with bearings 76 and 77 respectively supporting the output shaft 78. Mounted on the output shaft is a gear 79 within the housing 75 which is in mesh with gear 80 on jack shaft 81 similarly supported by bearings 82 and 83 in the covers 72 and 73, respectively. The end cover 73 of the motor 2 is provided with a lower oblate projecting portion 85 having an annular projecting portion 86 provided with a roller or ball bearing 87 surrounding and supporting the drive shaft 78. A seal 88 is also provided about the shaft 78 inboard of the bearing 87. The end wall 90 of the cover element 6 may be secured to the projecting portion 85 of the motor cover by means of suitable fasteners such as the screws 91. An annular seal 92 is provided between the portion 85 and the end wall of the cover sealing the cover to the motor housing to provide a fluid-tight interior reservoir for the hydraulic fluid for the transmission.

As seen in FIG. 1, the end covers 72 and 73 may be held to the motor housing 75 by means of tie bolts 93 extending through the oblate lower end portion 85 thereof. Tie bolts 94 extending through the upper portion of the end cover 73 may extend entirely through the cover 72 and into the block 20 as shown at 95 in FIG. 2 so that the motor 2 will be held firmly to the block 20 and thus in proper position with respect to the pump 1.

As seen more clearly in FIGS. 4 and 5, the end cover 72 of the motor 2 is provided with a transverse passage 98 interconnecting the main fluid passages 70 and 71. The ends of such passages are plugged as indicated at 99 and 100 and valve seat inserts 101 and 102 are placed within shoulders in the passageway 98 and a shuttle valve member 103 is situated therebetween. Between such valve seats, there is a passageway 105 leading to a high pressure, e.g. 2000 p.s.i., relief valve 106. The cover 72 also includes ports or passages 107 and 108 constituting continuations of the main flow lines 70 and 71, respectively, which lead to the inlet and outlet passages 109 and 110, the function of the latter passages depending upon the flow direction of the pump 1 obtained by the control handle 50.

As seen more clearly in FIG. 12, the block 20 includes a further transverse passage 112 in which is situated a neutral or free-wheeling valve 113. Such valve includes a spring loaded plunger 114, the rounded end 115 of which projects through the valve housing for selective engagement with projection 116 of the pump control operator 44. In rotor-pintle pumps of the type illustrated, it has been found that as the ring or bearing 32 approaches a position of concentricity with the rotor or pintle axis, the motor 2 tends to lock out. In such concentric position, the pump will effectively block flow between the main passages 70 and 71 and, of course, the motor will not free-wheel when a pump of this type is at zero displacement. It is to preclude this lock out and to obtain free-wheeling of the motor that the passage 112 and the free-wheeling valve 113 are provided. When the poppet type free-wheeling valve 113 is spring biased to a closed position, it will, of course, block fluid flow in passage 112 but when opened against such spring pressure, the passage 112 will then be opened by-passing the pump 1. The free-wheeling valve 113 is operated by the same pump control operator 44 employed to control the direction and capacity of the pump 1. The projection 116 is arranged to engage the rounded top 115 of the poppet valve member 114 to depress the same as the handle approaches the neutral or vertical position. It has been found that the aforementioned motor lock out occurs when the pump output falls below approximately 15% of its maximum flow and accordingly there is provided a clearance between the projection 116 and the top 115 of the valve member 114 so that the valve is only actuated when the projection 116 is within 10° of neutral or a vertical position of the handle. Accordingly, from this 10° point on either side, until the control handle 50 is in its neutral or vertical position, the valve 113 will be opened permitting the flow from lines 70 to 71 or vice versa. Thus the motor 2 can operate as a free-wheeling unit as the pump bearing assembly 32 approaches its concentric or neutral position.

In certain instances, it may be desirable to limit the extent of eccentricity of the bearing assembly 32 with respect to the rotor and pintle and to this end a stop screw 120 may be threadedly secured in tapped aperture 121. The bearing housing 34 will engage the stop screw as shown at 122 when the bearing housing obtains the position selected by adjustment of such screw.

It has been noted in pumps of the disclosed type that increased pressure to the pump causes the bearing assembly 32 to move towards the concentric position which, of course, tends to decrease flow. The application of a spring load which will tend to keep the housing at its selected position of eccentricity will then cause the pump to deliver automatically an infinitely variable flow with changes in pressure. This pressure increase may result from an increased torque being demanded from the hydraulic motor such as that encountered in a vehicle as it goes or starts up a hill. In the control embodiment of the present invention shown in FIGS. 1 and 3, for example, this has been accomplished by incorporating the spring loading means in the handle itself. The handle 50 is thus made from spring steel so that it will function as the spring means for controlling this displacement uniformly regardless of whether the control handle is in reverse or forward position, i.e. on either side of a vertical plane as seen in FIG. 12. A quadrant 125 is mounted on support 126 projecting from the transmission housing member 5 and such quadrant is provided with a top flange 127 which has notches 128 positioned in the laterally projecting edge thereof. In the control handle embodiment illustrated in FIGS. 1 and 3, there may be provided two notches on either side of the vertical or straight up notch maintaining two positions in both the forward and reverse directions in addition to the vertical or neutral position of the handle. When the handle of the pump is placed on one side, for example, or the forward position at the outermost notch, the handle will be engaged within such notch and the natural resiliency of the handle 50 will tend resiliently to maintain the handle and the pump bearing ring 32 at such selected position of eccentricity. However, as a vehicle approaches or climbs a hill, the torque demand and thus the pressure will increase tending to move the bearing assembly 32 to a more concentric position thus reducing the output of the pump.

It is noted that the support 126 for the quadrant 125 as well as the hub 48 for the handle 50 project outwardly through an air foil housing 130 secured to bosses 131, preferably four in number, mounted on the front cover 4 of the transmission housing 3. A fan or like blower 132 is mounted on the rotor within the air foil housing 130 to draw air through the opening 133 in such housing and to force such air radially outwardly and then along the exterior of the housing to keep the components of the transmission and the working fluid properly cooled.

It can now be seen that there is provided a very compact integral hydrostatic transmission wherein the pump and motor are both within the same housing and such housing acts as a fluid reservoir. It will, of course, be understood that the transmission may be of the split type wherein the pump and motor are in separate housings and connected by fluid lines. It will also be understood that a differential may be incorporated in the housing connected directly to the output shaft 78.

Figure 6:
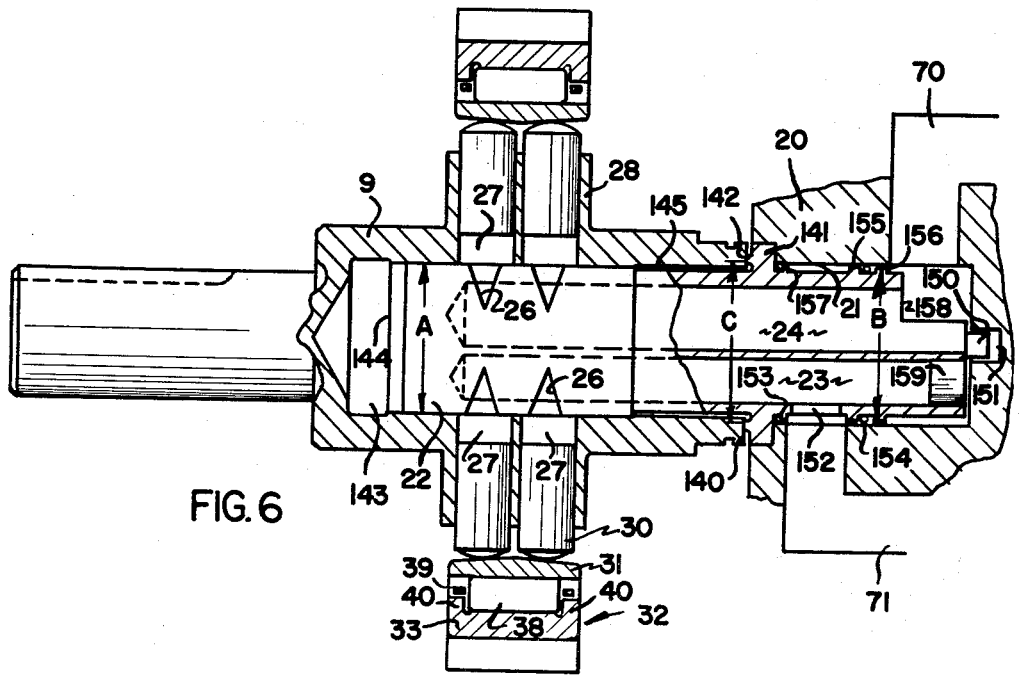
FIG. 6 is an enlarged detail view partially broken away and in section of the improved rotor and pintle construction for the pump.

In the testing of rotor-pintle type pumps as shown in the transmission of FIGS. 1 through 6, it has been discovered that the greatest leakage path is between the pintle and the rotor. Consequently, as shown in FIG. 6 in more detail, there is provided an improvement in the rotor and pintle construction in which the pintle will seal against the end of the rotor to trap the leakage between the rotor and pintle so as to improve the overall efficiency of the pump and thus the transmission.

Referring now to such FIG. 6, it will be seen that the close fit of the fixed pintle 22 within the rotor 9 provides a valving means between the passages 23 and 24 of the pintle through the ports 26 to the respective bores 27 of the rotor within the hub 28 as the rotor rotates about such pintle. At the end 140 of the rotor 9, the pintle 22 is provided with a sealing flange 141 which makes engagement with such end of the rotor. By controlling the diameter of the pintle, it is possible to obtain a slight differential load which will urge the pintle axially into engagement with the rotor. For example, the dimension A or the pintle diameter within the rotor may be 1.125" and the outer or right hand portion of the pintle as seen in FIG. 6, may have a diameter or dimension B equal to 1.250". The sealing flange 141 is provided with an annular lip 142 which may have an inside diameter equal to dimension C or 1.155". The high fluid pressure within the rotor will fill the void 143 and act on the end face 144 of the pintle tending to move it axially outwardly or to the right as seen in FIG. 6. Such fluid pressure obtains in the void 143 by leakage along the exterior of the pintle and such high fluid pressure also acts within the annular portion 145 between the rotor and pintle acting on the area between the pintle and the inside diameter of the lip 142. Thus the pressure within the rotor acts on the total area C tending to force the pintle out of the rotor. However, since the outer diameter B is slightly greater than the inner diameter C and the pressures acting on such areas are always the same, the pintle will always remain in engagement with the rotor, preventing any leakage along the pintle diameter from escaping and causing loss of efficiency. Such diameters B and C will, of course, be exposed to the same high working pressures and the slightly larger diameter B will cause the pintle 22 always to move to the left as seen in FIG. 6 maintaining the sealing flange lip 142 in proper sealing engagement with the end 140 of the rotor 9. Briefly stated, it can be seen that the force pushing the pintle off the rotor seat equals the area C (1.05×P) which is less than the area B (1.22×P) where P equals the pressure in p.s.i.

For example, at 500 p.s.i. operating pressure in line 70, the area C equals 1.05×500 which equals 525 pounds. The area B equals 1.22×500 or 610 pounds. Thus at 500 p.s.i. operating pressure, there is a differential of 85 pounds pressure tending to maintain the pintle seated against the rotor. At 1600 p.s.i. operating pressure, the area C equals 1.05×1600 or 1680 pounds. The area B equals 1.22×1600 or 1952 pounds. Thus at 1600 p.s.i. a pressure differential of 272 pounds is provided. It can be seen that as the operating pressure increases, so does the differential pressure.

The pintle 22 may be held against rotation by a tab or key 150 fitted within keyway or slot 151 in the block 20. The low pressure from line 71 entering the pintle passageway 23 passes through aperture 152 in the pintle which is sealed by O-rings 153 and 154 sealing the pintle within the block bore 21. The O-ring 154 may be held between two annular flanges, as shown, 155 and 156, and the O-ring 153 may be held between the back of the sealing flange 141 and a somewhat smaller annular flange 157. The end of the passageway 24 may be cut-away as shown at 158 to provide direct communication between the passage 70 in the block 20 and the passage 24 in the pintle 22. A plug 159 closes the end of the passage 23 within the pintle.

Figure 13:
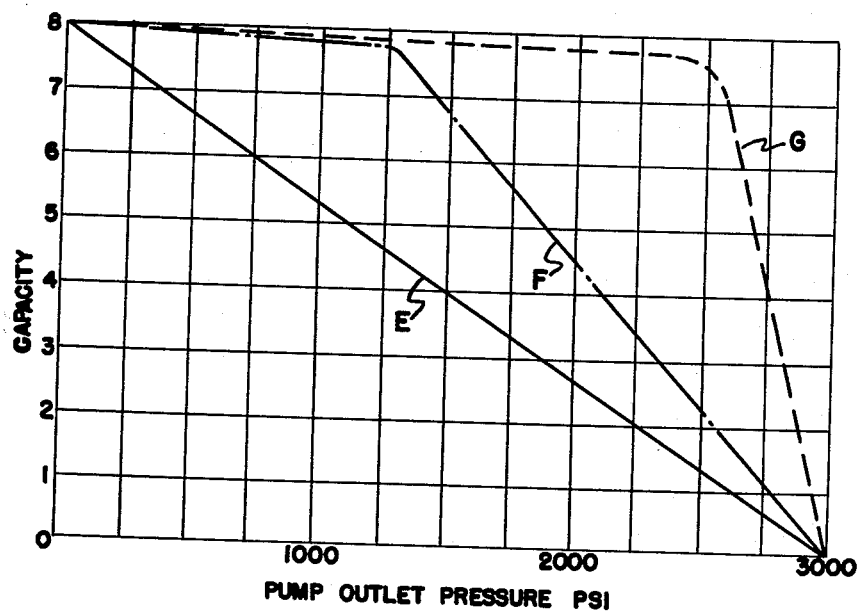
FIG. 13 is a graph showing the various pump performance curves that may be obtained with the control of FIG. 7.

In the illustrated hydrostatic transmission, there is employed a resilient spring member to control the displacement of the pumping means, in point, a radial pintle type pump. By separating the pumping means from the transmission, as in the case of a split transmission, there can be obtained a variable volume pump which will have a number of features. Referring now to FIGS. 7 and 13, and more particularly to the performance graph of FIG. 13, there are shown three different performance curves, namely E, F and G for a variable volume pump. These variations in performance are obtained by positioning the leaf spring control 160 of the pump 161 at E, F, and G corresponding to the performance curves of FIG. 13. In the position E, there is no pre-load on the spring 160 and consequently, the pump delivery will vary proportionately with the pressure. In positions F and G, the spring 160 is pre-loaded, holding the pump in full displacement until a predetermined pressure is reached. Thus in the E position, as the pump outlet pressure increases from 0 to 3000 p.s.i., the pump capacity will vary directly from 8 gallons per minute to 0, for example. In the position F, however, the pre-loading of the spring control 160 will cause the pump to maintain substantially its maximum capacity until the pump outlet pressure obtains approximately 1250 p.s.i. From that pressure, the capacity will uniformly decrease as the outlet pressure increases. In the position G, the preload of the spring operator 160 will cause the pump to hold substantially its full displacement until approximately 2500 p.s.i. outlet pressure is reached and from there to 3000 p.s.i., the capacity of the pump will uniformly drop off. The pump 161 may be provided with a body or housing 163 provided with outlets 164 for lines leading to a gear type motor or the like. A cover 165 may be provided and a splined drive shaft 166 will rotate the rotor with respect to the fixed pintle. The spring operator 160 will be employed to move a projection or cam 167 to control the eccentricity of the bearing structure with respect to the axis of the pintle and rotor.

A control quadrant 168 may be provided on the body 163 and, of course, such quadrant includes two sectors in which the leaf or spring 160 operates, depending upon the desired direction of rotation of the pump. Thus in the positions H, I and J, the same respective performance curves as seen in FIG. 13 will be obtained, only in the opposite direction of motor rotation and flow.

The arcuate control bar 169 having the notches 170 therein is employed in a manner similar to the quadrant shown in FIGS. 1 and 3, for example, but preliminarily or initially deforms the spring leaf 160 to obtain the desired pre-loading of such operator. The entire pump assembly may be mounted in a common housing as shown in FIG. 7 and the pump body 163 is sufficiently large to form a reservoir, with, for example, a one-half gallon capacity.

In FIG. 8, there is shown a slightly modified integral hydrostatic transmission wherein the transmission body 172 houses both the pump and motor. The drive shaft 173 for the rotor of the pump projects from the cover 174 and the driven motor shaft 175 projects from the opposite end of the body or housing 172. A quadrant or guide 176 is attached to the body 172 and serves as a guide for control handle 177. Such handle is provided with a control knob 178 and in this control embodiment, such handle 177 is attached to a separate member from the spring leaf 179. It has been found in certain cases that the use of a spring leaf alone leaves something to be desired, since it is not sufficiently rigid enough to mount a handle and yet function to control the displacement of the piston pump. With the embodiment shown in FIGS. 8, 9 and 10, the handle 177 and its ball grip 178 is a rigid member having a loose fit on the shaft 180 which controls the displacement of the pump in the same manner as the shaft 45 in FIG. 3. This loose fit is accomplished simply by a slightly oversized aperture 182 in the proximal end of the rigid handle 177. Adjacent the lower end of the handle 177 on the shaft 180 is a split collar 183 which is fastened by the nut and bolt assembly 184′ to the proximal end of spring leaf 179. The collar 183 is, of course, rigidly secured to the shaft 180 and this can be accomplished by the proximal end of the spring leaf 179 projecting within a keyway 184 within such shaft.

At the other end of the spring leaf 179, there is provided a slotted fastening 185 which locates the spring 179 in relation to the rigid handle 177. This fastening is, of course, slotted and has a very loose fit in relation to the spring leaf in order that the spring leaf may bend independently of the rigid member. The handle 177 is also slotted as indicated at 186 and the fastening 185 is adjustably secured within such slot by means of the stud and nut assembly 188. In this manner, the fastening can be positioned adjustably longitudinally of the handle 177 to obtain the desired torque control necessary from the hydraulic piston pump. By moving the fastening 185 closer to the shaft 180, it can be seen that the effective length and flexure of the spring leaf 179 is reduced. Simply by placing the fastening 185 at its maximum radially outward position, as shown, the maximum effective length of the spring 179 and its flexure can be obtained. The handle 177 may then adjustably be positioned along the quadrant 176 and the position of the slotted fastening adjusted along the slot 186 to obtain the desired direction, capacity and torque control necessary from the hydraulic piston pump.

In certain applications of the present hydrostatic transmission, it may be desirable to have a selective lock out or free-wheeling in the neutral position. This selective action may be obtained by the improvement shown in FIG. 11. This improvement consists of a wedge 190 mounted on control handle 191 which may be selectively interposed between the neutral projection 116 of the operator 44 and the neutral valve 113 so that in one position, the neutral valve will remain closed when the shift control 50 is in neutral or vertical position. This can be accomplished by retracting the handle 191 to cause the neutral valve not to open when the control 50 is in neutral or vertical position. In this position, the flow to and from the hydraulic motor will be locked. However, when the wedge 190 is depressed as shown, the neutral valve will be opened when the control handle 50 is in its neutral or vertical position. In this position, the flow of fluid to and from the motor by way of by-pass passage 112 is open, permitting the hydraulic motor 2 to rotate freely. An O-ring seal 192 is provided around the wedge control shaft 190 as it projects through the housing wall 193 and this O-ring can act both as a seal and as a friction member to hold the wedge in the desired position. The top of the wedge control shaft 191 is provided with an operating knob 194 which will project through the housing just to the rear of the control handle 50. Then, the operator by pulling the knob 194 outwardly can obtain a lock out or hill hold position of the wedge 190 so that the handle 50 in neutral position will be ineffective to open the free-wheeling valve 113. To obtain free-wheeling, the operator simply depresses the knob 194 interposing the wedge 190 between the projection 116 and the free-wheeling valve 113 to cause the same to open when the handle 50 is in neutral position.

*Resume of operation*

The operation of the hydrostatic transmission of the present invention will be seen more clearly in FIG. 12. In the illustrated schematic showing, the operating handle 50 is moved to the left of a vertical plane pivoting the bearing housing 34 to an eccentric position about the pivot 36 so that the pistons 30 will be forced inwardly in the five to twelve o'clock position of the quadrant as the rotor 28 rotates in a counterclockwise direction as shown. This will then pressurize the line 70 at high pressure. The movement of the handle 50 to the left of a vertical plane releases the free-wheeling spring loaded poppet valve 113 to close the by-pass passage 112 between the lines 70 and 71. The high pressure in line 70 will close check valve 66 and shift the shuttle valve 103 to expose the high pressure relief valve 106 to the pressure in line 70. The high pressure in line 70 will then cause the gears of the motor 2 to rotate as indicated by the arrows.

The pistons 30 will move outwardly in the twelve to seven o'clock quadrant as the rotor rotates in a counterclockwise direction and the pistons are maintained outwardly by the make-up pump 55 drawing fluid from the reservoir through filter 64 into the line 68. Since the check valve 66 is closed by the high pressure in line 70, the fluid will flow through the check valve 67 and into the line 71 maintaining such line at the required low pressure to maintain the pistons against the inner race of the bearing housing 34.

In the neutral position, the handle 50 will be shifted to a vertical plane causing the housing 34 to assume a position concentric with the axis of the rotor 9 and pintle 22. While the rotor will continue to rotate in a counterclockwise direction, as shown by the arrow, no fluid will flow from line 71 to line 70 due to the non-displacement of the pistons 30 within the rotor hub 28. As the projection 116 on the handle operator 44 approaches within 10° of the neutral position, the projection will engage the rounded end 115 of the poppet valve member 114 opening the by-pass passage 112 so that fluid will be free to circulate from the motor 2 through the lines 71, 112, 70 and back to the motor 2 permitting a free-wheeling thereof. It will, of course, be understood that a wedge or other type control may be interposed between the neutral valve 113 and the operator projection 116 so that the neutral valve 113 will be opened in the neutral position of the handle 50 only when desired. In this manner, a free-wheeling or hill hold condition can be obtained selectively.

To place the transmission in reverse, the operating handle 50 is moved to the right of a vertical plane which would elevate the bearing housing 34 about the pivot 36 so that as the rotor hub 28 continues to rotate in a counter-clockwise direction, the pistons 30 will move outwardly in the five to twelve o'clock quadrant and inwardly in the twelve to seven o'clock quadant. Thus the line 71 will be pressurized at the working high pressures and the line 70 will be at a low pressure line. The gears of the motor 2 will then rotate in the opposite direction. Movement of the hub operator 44 to the reverse position will clear the projection 116 from the poppet valve member 114 blocking the passage 112. The high pressure in line 71 will close check valve 67 requiring the output of the make-up pump to pass through the check valve 66 into the now low pressure line 70. The shuttle valve 103 will be shifted, but will still expose the high pressure relief valve 106 to the high pressure in line 71 through the passage 98. It is noted that the low pressure relief valve 69 will always be exposed to the output pressures of the make-up pump 55 since either of the check valves 66 or 67 will protect such relief valve from the high working pressures of the transmission.

As the torque demand of the motor 2 increases, as for example, when a vehicle starts up a hill, the pressure in line 70 will increase and the increased pressure to the hydraulic pump will tend to cause the bearing housing 34 to move towards its concentric position. This, of course, would tend to move the operating handle 50 back to its vertical position from that shown in FIG. 12. By making the handle 50 of a spring material and placing its outer end in the notch of a quadrant, for example, as the pump bearing housing 34 moves to its concentric position against the spring pressure of the handle 50, the flow will be reduced proportionately causing the motor 2 to slow down as the demand for pressure increases. Conversely, when the torque output demand diminishes, the pressure demand also diminishes and the spring handle 50 will bias the bearing housing 34 to its position of selected eccentricity permitting the pump to increase its displacement proportionately. With the handle improvements shown in FIGS. 8, 9 and 10, the spring bias or resiliency acting upon the bearing housing 34 can closely be controlled.

By pre-loading the pump control means, a variable volume pump can be obtained wherein the pump delivery will vary proportionately with the pressure only beyond a selected certain pressure. Thus, pump performance curves as illustrated in FIG. 13 may be provided where the preloading of the handle or spring will maintain the pump capacity at substantially its maximum extent to a predetermined pump outlet pressure before the capacity will then vary with the pressure. Also, with the pressure loading of the pintle causing the same to seat against the end of the rotor, fluid leakage along the pintle between the rotor and pintle can be minimized thereby obtaining a much more efficient pump and thus a more efficient hydrostatic transmission. Although the hydraulic motor, in the described transmission, is illustrated as a gear motor, it will readily be understood that a vane or piston motor may equally well be employed.

Other modes of applying the principle of the invention may be employed, change being made as regards the details described, provided the features stated in any of the following claims or the equivalent of such be employed.

I, therefore, particularly point out and distinctly claim as my invention:

1. A hydrostatic transmission comprising a fluid pump, said pump including a valving pintle and a rotor mounted for rotation about said pintle, a motor driven by the output of said pump, and fluid pressure means operative sealingly to seat said pintle within said rotor effectively to prevent fluid leakage between said rotor and pintle.

2. A hydrostatic transmission as set forth in claim 1 wherein said pintle is provided with a sealing flange adapted to engage an end of said rotor, and means operative to supply a differential fluid pressure on said pintle operatively to urge said sealing flange of said pintle against the end of said rotor.

3. A fluid pump for hydrostatic transmissions and the like, comprising a valving pintle and a rotor mounted for rotation about said pintle, a sealing flange on said pintle adapted to engage an end of said rotor, and differential fluid pressure means acting on said pintle operative always to urge said pintle and thus said sealing flange into operative sealing engagement with the end of said rotor.

4. A pump for hydrostatic transmissions and the like, comprising a valving pintle and a rotor mounted for rotation about said pintle, a sealing flange on said pintle operative to engage an end of said rotor, said pintle being of larger diameter beyond said sealing flange whereby fluid pressure acting upon said larger diameter will always operatively urge said pintle and thus said sealing flange into engagement with the end of said rotor thereby to prevent leakage along said pintle.

5. A fluid pump comprising a non-rotative valving pintle, a rotor mounted for rotation about said valving pintle, radially extending pistons in said rotor, means operative to reciprocate said pistons in response to rotation of the rotor thereby to force fluid through said valving pintle, a sealing flange on said pintle operative to engage the end of said rotor, said pintle being of a larger diameter beyond said sealing flange than within said rotor, whereby the same fluid pressure exposed to said diameters will operatively urge said pintle and thus said sealing flange against the end of said rotor thereby to prevent leakage of fluid along said pintle within said rotor.

6. A hydrostatic transmission including a reversible variable capacity pump and a motor, said pump including a valving pintle and a rotor mounted for rotation about said pintle, means operatively connecting said pump to said motor, a control mechanism operatively connected to said pump to reverse the flow therethrough and to control the capacity thereof, said pintle including different diameters exposed to the same fluid pressure operative to urge said pintle into sealing engagement with said rotor.

7. A hydrostatic transmission as set forth in claim 6 wherein said pintle between said diameters includes a sealing flange operative to engage an end of said rotor.

8. A variable capacity pump comprising a fixed axis non-rotative valving pintle, a rotor closely fitted on said pintle and operative to rotate thereabout, radially extending bores in said rotor, pistons reciprocably mounted in said bores and projecting radially beyond said rotor, a bearing surrounding said rotor and operative to engage the projecting ends of said pistons, a housing retaining said bearing and having a pivot point offset from the axis of said valving pintle whereby said housing and thus said bearing may be moved oppositely eccentrically with respect to the axis of said valving pintle thereby to vary the displacement of said pump; a sealing flange on said valving pintle operative to engage an end of said rotor, said pintle being of different diameters on opposite sides of said sealing flange whereby the discharge fluid pressure of said pump acting on said diameters will operatively urge said sealing flange into sealing engagement with the end of said rotor thereby to prevent leakage between the rotor and pintle.

9. A hydrostatic transmission as set forth in claim 8 including control means operative eccentrically to shift said housing with respect to said valving pintle and rotor comprising an operator, means mounting said operator for rotation on a fixed axis, a projection on said operator engaging said housing operative to move said housing about its offset pivot as said operator is rotated about said fixed axis, and handle means connected to said operator operative thus to rotate said operator.

10. A hydrostatic transmission as set forth in claim 8 including control means operative thus eccentrically to shift said housing with respect to said valving pintle and rotor comprising a spring leaf handle, means to retain said spring leaf handle in selected positions providing predetermined flow from said pump, said handle resiliently maintaining said housing in the selected eccentric position.

11. A hydrostatic transmission as set forth in claim 8 including control means operative thus eccentrically to shift said housing with respect to said valving pintle and rotor comprising an operator engaging said housing, a pump by-pass valve, and means on said operator operative to engage said valve to by-pass said pump as said operator moves said housing to a position whereby said housing and rotor approach concentricity.

12. A hydrostatic transmission of the type having a reversible variable capacity pump operatively connected to a motor, a control mechanism operatively connected to said pump to reverse the flow therethrough and control the capacity thereof, a handle for said control mechanism operative to maintain said pump in a selected flow position, an operator connected to said handle, a pump by-pass valve, and means selectively interposable between said operator and by-pass valve either to open or close said by-pass valve when said handle is in neutral position.

13. A hydrostatic transmission as set forth in claim 12 wherein said means selectively interposable between said operator and by-pass valve comprises a wedge, handle means on said wedge projecting through the housing of said transmission, and means sealing said wedge handle with respect to the housing of the transmission and frictionally maintaining said wedge handle in its selected position of interposition.

14. A control mechanism for a hydrostatic transmission of the type having a variable capacity pump and a rotor connected thereto comprising an operating handle operatively connected to said pump and adapted to be shifted to a position obtaining a selected flow output for said pump in either direction or a neutral or non-flow position, means operative selectively in response to the movement of said handle to neutral position to open a valve in a by-pass line around said pump to obtain free-wheeling when said pump is in neutral position, said means comprising a wedge selectively interposable between said control handle and a by-pass valve in said by-pass line.

15. A hydrostatic transmission comprising a variable capacity pump and a motor driven thereby, said pump including a fixed axis valving pintle and a rotor rotating thereabout, radially extending bores in said rotor, pistons reciprocably mounted within said bores and projecting radially beyond said rotor, a bearing surrounding said rotor and operative to contact the projecting ends of said pistons, a housing retaining said bearing and having a pivot point offset from the axis of said pintle whereby said bearing may be moved oppositely eccentrically with respect to the axis of said valving pintle thereby to vary the displacement of said pump, control means operative thus eccentrically to shift said housing with respect to said valving pintle and rotor comprising an operator, shaft means mounting said operator for rotation on a fixed axis, said operator having a projection engaging said housing adapted to move said housing about said pivot as said operator is rotated about said fixed axis, leaf spring means connected to said shaft means and to said handle operative resiliently to maintain said operator in a selected position providing selective flow from said pump.

16. A hydrostatic transmission as set forth in claim 15 including a slotted fastener adjustably longitudinally mounted on said handle retaining said leaf spring means whereby the degree of resiliency maintaining said operator in the selected position can closely be controlled.

17. In a control mechanism for a hydrostatic transmission of the type having a variable capacity pump and a motor connected thereto, a rigid operating handle operatively connected to said pump and adapted to be shifted to a position obtaining a selected flow output for said pump, and spring leaf means resiliently interconnecting said handle and pump operative resiliently to maintain said pump in its thus selected position.

18. A control mechanism as set forth in claim 17 including an operating control shaft for said pump, said rigid handle being loosely mounted on said shaft, and leaf spring means rigidly connected at one end to said shaft and adjustably loosely connected at the opposite end to said handle thereby to bias said shaft resiliently to the position selected by said rigid handle.

19. A control mechanism as set forth in claim 18 wherein said rigid handle includes a longitudinally extending slot, a slotted fastener adjustably mounted within said slot restraining the distal end of said leaf spring, said slotted fastener being adjustable along said slot in said rigid handle thus to control the effective length of said leaf spring.

20. A variable capacity pump comprising a fixed axis valving pintle and a rotor adapted to rotate thereabout, radially extending bores in said rotor, pistons reciprocably mounted in said bores and projecting radially beyond said rotor, a bearing surrounding said rotor and adapted to engage the projecting ends of said pistons, a housing retaining said bearing and having a pivot point offset from the axis of said pintle whereby said housing and thus said bearing may be moved oppositely eccentrically with respect to the axis of said valving pintle thereby to vary the displacement of said pump, control means operative thus eccentrically to shift said housing with respect to said valving pintle and rotor including spring means operative resiliently to maintain said housing in its thus selected position of eccentricity, and means to pre-load said spring means operative to maintain said housing at its thus selected position of eccentricity until a predetermined operating pressure is obtained and thereafter to vary the delivery of the pump proportionately with pressure.

21. A pump as set forth in claim 20 including means adjustably to pre-load said spring means to obtain different performance curves for said pump in terms of capacity and pump outlet pressures.

22. In a variable capacity pump of the type wherein an increase in operating pressure decreases the capacity of such pump, pivotally mounted control means operatively connected to said pump resiliently to bias said pump to its selected maximum capacity position, and spring leaf means to pre-load said control means operative to maintain said pump at its selected maximum capacity position until a predetermined operating outlet pressure is obtained.

23. A hydrostatic transmission comprising a transmission housing, a fluid pump mounted in said transmission housing, said pump including a valving pintle and a rotor mounted for rotation about said pintle, said rotor projecting through said housing, a porting block secured to said pump and non-rotatively receiving an end of said pintle, and a fluid motor mounted on said block with said block providing fluid communication between said pump and motor.

24. A hydrostatic transmission as set forth in claim 23 including a make-up pump, a pair of check valves in said porting block operative to direct the output of said make-up pump to the inlet of said rotor-pintle type pump, and a low pressure relief valve interposed between said check valves.

25. A hydrostatic transmission as set forth in claim 24 wherein said make-up pump is a gear-type pump, and a power train interconnecting said rotor and make-up pump operative to drive the same.

26. A hydrostatic transmission as set forth in claim 23 including a bore in said porting block, said pintle being non-rotatively secured in said bore, a sealing flange on said pintle operative to engage an end of said rotor, a fluid pressure differential means operative to urge said pintle toward said rotor and said sealing flange into sealing engagement with the end of said rotor.

27. A hydrostatic transmission as set forth in claim 26 wherein said transmission housing serves as a fluid reservoir, an air foil housing about said transmission housing, and a fan on the projecting end of said rotor operative to draw air through said air foil housing and cool the transmission.

28. A hydrostatic transmission as set forth in claim 23 wherein said fluid motor includes two end covers, a high pressure relief valve, and a shuttle valve in one said end cover operative to expose the inlet to said motor to said relief valve.

References Cited by the Examiner

UNITED STATES PATENTS

| | | | |
|---|---|---|---|
| 2,008,687 | 7/35 | Dean | 60—53 |
| 2,042,480 | 6/36 | Patterson | 60—53 |
| 2,211,402 | 8/40 | Benedek | 60—53 |
| 2,217,172 | 10/40 | Laussucq | 60—52 |
| 2,226,481 | 12/40 | Rose | 60—53 |
| 2,420,806 | 5/47 | Anderson | 103—161 |
| 2,747,515 | 5/56 | Montelius | 103—161 |
| 3,008,423 | 11/61 | Miller | 60—53 X |
| 3,054,263 | 9/62 | Budzich et al. | 60—53 |
| 3,106,108 | 10/63 | Thoma | 60—53 X |

JULIUS WEST, *Primary Examiner.*

EDGAR W. GEOGHEGAN, *Examiner.*